Oct. 16, 1956   A. E. R. ARNOT ET AL   2,767,394
TIPPING MOMENT INDICATOR FOR LIFTING TRUCKS
Filed April 8, 1954
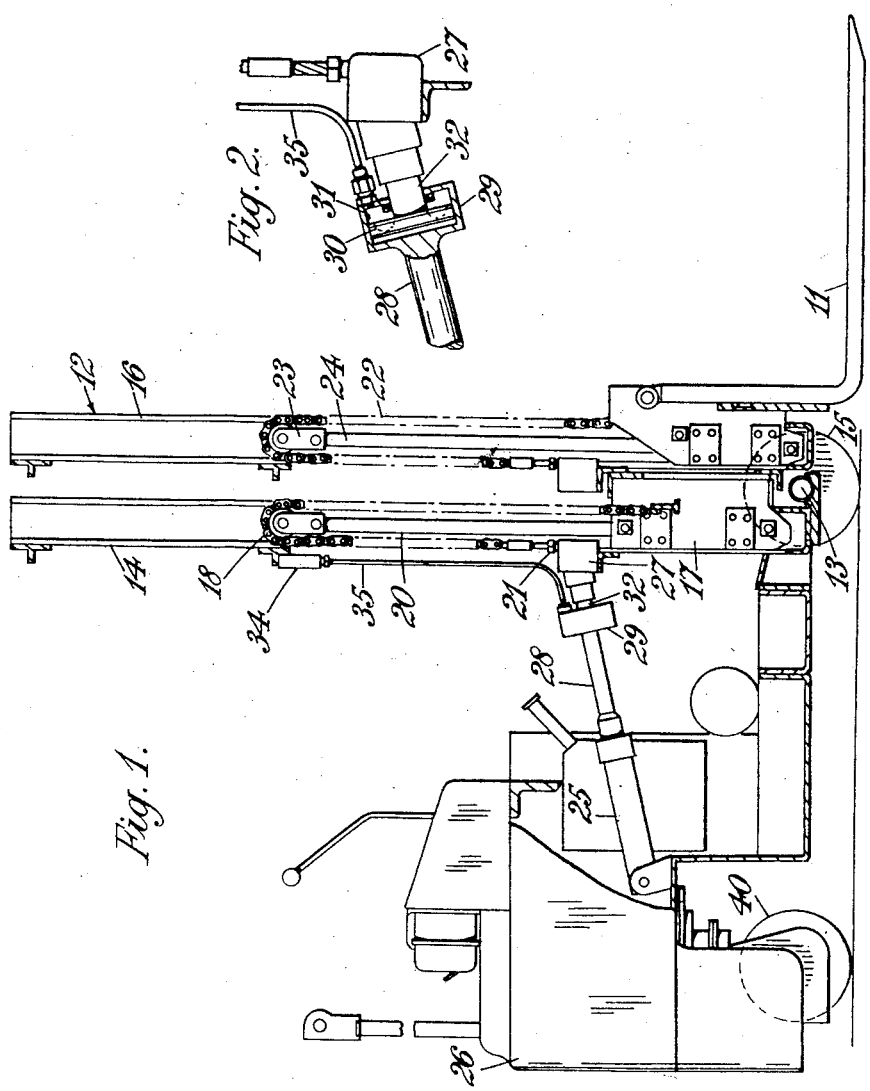
INVENTORS
Alfred Erwin Reginald Arnot
Marcel Henry Choules
BY Martin Kirkpatrick
ATTORNEY

United States Patent Office 2,767,394
Patented Oct. 16, 1956

2,767,394

TIPPING MOMENT INDICATOR FOR LIFTING TRUCKS

Alfred Erwin Reginald Arnot and Marcel Henry Choules, Basingstoke, England, assignors to Emmanuel Kaye and John Reginald Sharp, both of Basingstoke, England Application April 8, 1954, Serial No. 421,926

7 Claims. (Cl. 340—267)

This invention comprises improvements in or relating to lifting trucks for pallets, stillages and the like.

The type of lifting truck to which the present invention relates is that which is provided with a projecting fork or other lifting member capable of being lowered and engaging a pallet or stillage or other means for carrying goods, and then, after it has been engaged with the goods, of being raised until the goods are at a desired height, after which the truck transports the goods while they are supported by the projecting fork or other lifting member. As in such a truck the goods overhang the end of the truck it is normal to arrange the weight of the parts of the truck as far as possible from the lifting end so that the goods, up to a certain weight and overhang, can be lifted without any risk of tipping the truck over, about its front axle.

If the overtipping moment is excessive, it is dangerous to attempt to lift the goods. It is characteristic of this type of truck that the overtipping effect is a function of both the load and the distance of the centre of gravity of the load from the front axle. To compute it, both the load and position of the centre of gravity of the load must be known. Obviously truck operators cannot be expected to perform such computations.

Moreover, the values of safe weight and overhang vary according to whether the truck is on level ground, is pointing uphill or pointing downwards, being lowest in the last-mentioned case and this would further complicate computation. In any event the operator has no ready means of determining the above-mentioned factors which govern the tipping moment of the goods which he is handling and cases often arise where the goods are too heavy or too long. If they are much too heavy or long the operator can feel the back end of the truck lift before the goods move and will desist, but if they are near the limit of moment they may be lifted for some distance with success and thereafter cause the truck to tip over either immediately it begins to move or some time in the course of its journey to the place where the goods are to be deposited, and it is possible for serious injury to result to the goods or to the truck or to the operator.

It has been proposed in British patent specification No. 650,375, to provide a piston and cylinder device which takes the pull of a lifting chain for a load-carrying fork in a truck of the kind to which the present invention relates, the cylinder being connected to a pressure gauge which showed the weight on the fork. It is not adequate to indicate to the operator the weight on the fork for the reasons above discussed and in the prior proposal there was a separate indication of the safe load for every different position which the centre of gravity of the load might occupy along the fork, but in the case of irregular loads the truck operator has no means of knowing the position of the centre of gravity.

According to the present invention a safe-load indicator for trucks such as fork trucks having load-carrying means which project beyond the truck wheel-base so that the load is carried outside the wheel-base and exerts a tipping-movement on the truck, comprises a stress-responsive device located on a member which resists the tipping-movement of the load-carrying means relatively to the body of the truck and means actuated by the stress-responsive device for affording an indication or warning to the operator of the tipping moment which is exerted on the truck. In this way the device indicates directly to the operator the tipping moment.

The stress responsive device may consists of a fluid pressure chamber the fluid in which transmits the tipping-stress and the means actuated by the stress-responsive device consists of a pressure gauge marked with a safe limit of pressure. Alternatively, it may operate an electrical contact member to make or break an electrical circuit and operate means which give a warning to the operator.

The disposition of the stress responsive device may vary considerably. It may, for example, be located at the point where the load is transmitted to the truck-supporting wheel or wheels which are located furthest from the overhung load-carrying means and may be constructed so as to afford a warning when the load on the said wheels is reduced to a safe minimum. In this case, strictly speaking, the stress to which the device responds is the difference between the stabilising moment for the weight of the vehicle about the axle nearest to the load and the over-tipping moment of the load.

Alternatively, where the truck comprises a mast carrying a projecting load-carrying fork, platform or the like, mounted so that the load can be tipped fore-and-aft, and the tipping is effected by a jack having a hydraulic cylinder and ram, the stress responsive device may be subjected to the force exerted by or on the jack. In this case, the stress borne by the stress responsive device is directly proportional to the tipping moment.

The following is a description of a preferred form of indicating device according to the present invention; reference being made to the accompanying drawing, in which:

Figure 1 is a side elevation, partly in section, of a truck bearing the device; and Figure 2 is a sectional detail of this stress-responsive element of the device.

The truck shown in Figure 1 is of the type in which the lifting fork or platform 11 of the truck is slidably mounted on an upstanding mast 12, and the mast is hinged at 13 so that it can be tilted back or forward. The mast shown is of the telescopic type. That is to say it comprises a rear section 14 pivoted at 13 on the axle of the front wheels 15, and a front section 16 carried in a block 17 which slides up and down the section 14. The block 17 is lifted by a chain 18 which is anchored at 21 to the mast 14 and works over a head 19 on a ram sliding in a hydraulic cylinder 20. Similarly, the fork 11 is lifted in the front section 16 by a chain 22 working over a head 23 of a ram in a cylinder 24. The tilting of the mast is effected by a double-acting hydraulic jack 25 having a ram 28 which extends from the body 26 of the truck to a point 27 on the mast and can be supplied with hydraulic pressure in either direction as desired to adjust the angle of the lifting mast. The more the weight on the fork 11 of the truck, or the greater the distance of the weight from the heel of the fork the more stress will be produced in the ram 28. Inserted in the length of the ram 28 is a stress-responsive device 29, the interior of which is shown in the sectional view, Figure 2. It comprises a piston 30 working in a cylindrical bore in the device 29 the piston 30 being formed on the end of a ram 32 which acts as the head of the ram 28. The space between the piston 30 and the end of the cylinder 31, through which the ram 32 passes, contains hydraulic fluid and the tendency is to expel the fluid by the pull of the mast 14 against the jack 25.

A pressure gauge 34 is connected to this side of the cylinder 31 by pipe 35 and will afford the required direct measure, not of the weight on the fork 11, but of the moment of this weight about the pivot 13 of the upstanding mast of the truck. This moment is a measure of the tipping movement which is being exerted on the truck by the weight of the fork 11 and on level ground it is resisted by the weight of the body 26 of the truck, which affords a counter moment which is constant. Therefore, the dial of the gauge can be marked to show when a dangerous load is located on the fork or platform 11.

This device, while perfectly simple and acting well, is slightly inaccurate if the truck is on a downwardly pointing slope as the counter moment of the weight of the body 26 will be reduced a little, but in general this error is a negligible part of the safety factor which must be allowed, and in any case the driving technique of such trucks makes it preferable for the load always to be kept uphill irrespective of the direction of travel.

In some cases the design of trucks embodies a single-acting tilt-jack instead of the double-acting jack 25, the parts which tilt around the pivot 13 being biased, either by their weight or by spring pressure or the like, to move forward when pressure is released from the jack, but being drawn rearwardly by applying pressure to the jack. In this case the hydraulic pressure applied to the jack itself will be a measure of the tilting moment, and by connecting a branch pipe to the pipe which supplies the jack and applying a pressure gauge to it, an indication of the tipping moment is afforded without the necessity of interposing the device 29. In this case the device for the measurement of force consists of the pressure gauge with the branch pipe, in conjunction with the jack cylinder itself.

If desired instead of having a dial in view of the operator such as the dial on the pressure gauge 34, a pressure responsive device can be arranged to close (or open) electrical contacts when a pre-determined pressure is reached. The electrical contacts would be employed to operate cut out means for preventing further extension of the ram 28 or for preventing the lifting of the platform 11. For example, the hand of the pressure gauge itself can be used to operate such contacts.

We claim:

1. A truck comprising a chassis having front and rear wheels, a mast located near the front wheels, a load-carrying device projecting forwardly from the mast in front of the front wheels, the mast and load-carrying device being pivoted relatively to the chassis about an axis substantially coincident with the vertical plane containing the axis of said wheels, a connecting element which resists forward pivotal movement of said mast and load-carrying device, a stress responsive device associated with said element and serving to respond to stress therein and an indicator actuated by the stress-responsive device and affording an indication to the operator of undue tipping moment exerted by the mast on the truck.

2. A truck as claimed in claim 1, wherein the element resisting pivotal movement of mast and load-carrying device consists of a movable member extending between chassis and mast, the stress-responsive device comprises a fluid-pressure cylinder and piston which transmits stress between said movable member and the mast, and the means actuated by the stress-responsive device comprises a fluid-pressure gauge connected thereto and visible to the operator of the truck.

3. A truck comprising a chassis having front and rear wheels, a mast located near the front wheels, a load-carrying device projecting forwardly from the mast in front of the front wheels, a connecting element uniting two parts of the truck which transmits stress between the mast and the back wheels thereof, a stress-responsive device associated with said connecting element and indicating means actuated by the stress-responsive device and affording an indication to the operator of undue tipping moment exerted by the mast on the truck.

4. A truck as claimed in claim 3, wherein the stress-responsive device is located in the connecting element between the chassis and the rear wheels of the truck and the indicator affords to the operator an indication of when a state is approached of no load on the rear wheels.

5. A truck as claimed in claim 3, wherein the mast is pivoted to the chassis about an axis substantially coincident with the vertical plane containing the axis of the front wheels and the stress-responsive device is located in the connecting element connecting the mast with the chassis and affords an indication to the operator when the tipping moment of the mast about its pivot approaches the value which will cause no load on the rear wheels.

6. A device according to claim 3, wherein the truck comprises a mast carrying a projecting load-carrying fork, platform or the like, mounted so that it can be tipped fore-and-aft, and the tipping of the mast is effected by a jack having a hydraulic cylinder and ram and wherein the stress-responsive device is subjected to force exerted at the jack.

7. A device as claimed in claim 6 modified in that the stress-responsive device consists of a pressure gauge connected in a branch line from the supply to the hydraulic jack cylinder, and wherein the hydraulic jack cylinder is a single-acting cylinder, so that the pressure therein is always a measure of the tipping moment.

References Cited in the file of this patent

UNITED STATES PATENTS

| | | |
|---|---|---|
| 2,346,066 | Conrad | Apr. 4, 1944 |
| 2,603,368 | Vance | July 15, 1952 |
| 2,638,336 | Wetsel | May 12, 1953 |
| 2,643,781 | Wise | June 30, 1953 |
| 2,659,505 | Shaffer | Nov. 17, 1953 |
| 2,678,207 | Wheeler | May 11, 1954 |

FOREIGN PATENTS

| | | |
|---|---|---|
| 650,375 | Great Britain | Nov. 8, 1949 |